United States Patent [19]
Kalsi et al.

[11] Patent Number: 5,602,430
[45] Date of Patent: Feb. 11, 1997

[54] SUPERCONDUCTING ELECTROMAGNET ARRANGEMENT FOR A MAGNETIC LEVITATION SYSTEM

[75] Inventors: Swarn S. Kalsi, Fort Salonga; Michael Proise, Garden City, both of N.Y.

[73] Assignee: Grumman Aerospace Corporation, Los Angeles, Calif.

[21] Appl. No.: 247,599

[22] Filed: May 23, 1994

[51] Int. Cl.⁶ ............................. B60L 13/00; H02K 41/00
[52] U.S. Cl. ............................. 310/12; 104/281; 104/284; 104/286
[58] Field of Search ................................ 104/281, 282, 104/284, 285, 286, 290; 310/90.5, 12, 13, 14

[56] References Cited

U.S. PATENT DOCUMENTS

| | | | |
|---|---|---|---|
| 4,953,470 | 9/1990 | Yamaguchi | 104/282 |
| 5,094,173 | 3/1992 | Tada et al. | 104/282 |
| 5,152,227 | 10/1992 | Kato | 104/286 |
| 5,189,961 | 3/1993 | Fujie | 104/281 |
| 5,249,529 | 10/1993 | Herbermann | 104/281 |

OTHER PUBLICATIONS

K. Sato et al. "High–Jc Silver–Sheathed Bi–Based Superconducting Wires," IEEE Transactions on Magnetics, vol. 27, No. 2, Mar. 1991.

P. Halder et al. "Processing High Critical Current Density Bi–2223 Wires and Tapes," JOM, Oct. 1992.

K. Sato et al., "Development of Silver–Sheated Bismuth Superconducting Wires and Their Application (invited)", J. Appl. Phys. 70(10), Nov. 1991.

Primary Examiner—Thomas M. Dougherty
Assistant Examiner—Judson H. Jones
Attorney, Agent, or Firm—Terry J. Anderson; Karl J. Hoch, Jr.

[57] ABSTRACT

A superconducting electromagnet arrangement includes a high temperature superconducting (HTS) coil surrounding a multiple-pole iron core for levitating and propelling a MAGLEV transport vehicle along a guideway. The HTS coil operates in the DC mode at approximately liquid nitrogen temperature of 77 K to induce in the iron core magnetic forces of attraction to levitate the transport vehicle a desired distance above a set of guideway rails. A preferred embodiment includes a Bi 2223 HTS coil surrounding a C-shaped iron core. The coil is constructed from a layer of pancake coils, the windings of which are fabricated from short lengths of commercially available conductor tape. The field strength in the core and the windings of the HTS coil are respectively approximately 1.8 T and approximately 0.3 T. To ensure vehicle stability, control coils are placed around the core legs to maintain the desired air gap length. The control coils may be copper coils, or may themselves be HTS superconducting coils operating in the AC mode at 77 K (nominal). A variation of the preferred embodiment includes three HTS coils surrounding respectively the three legs of a W-shaped iron core.

36 Claims, 3 Drawing Sheets 5,602,430

SUPERCONDUCTING ELECTROMAGNET ARRANGEMENT FOR A MAGNETIC LEVITATION SYSTEM

BACKGROUND OF THE INVENTION

1. Field of the Invention

This invention generally relates to a high speed magnetic levitation transportation system, and more particularly to an electromagnet for levitating and propelling a magnetic levitation vehicle along a guideway.

2. Description of the Related Art

Magnetic levitation (MAGLEV) transportation systems may be classified into two general categories based on the nature of their primary suspension systems: those employing an electromagnet suspension (EMS) system and those employing an electrodynamic suspension (EDS) system.

EMS-type MAGLEV systems levitate and propel a transport vehicle by inducing magnetic forces of attraction between vehicle-mounted electromagnets and ferromagnetic rails on a guideway. The German Transrapid is such a system. The electromagnets used in the German Transrapid have iron cores and nonsuperconducting copper coils. Excitation currents supplied to the coils induce a magnetic field in their respective iron cores. The poles of the cores, as a result, become attracted to the rails levitating the transport vehicle. U.S. Pat. Nos. 4,259,908, 4,953,470, and 5,152,227 disclose additional EMS-type MAGLEV systems which use iron-core electromagnets to levitate a transport vehicle.

There are a number of advantages and disadvantages associated with EMS-type MAGLEV systems such as the German Transrapid. One advantage is the existence of a low magnetic field in the passenger compartment of the transport vehicle. This is accomplished by confining most of the magnetic flux produced by the electromagnet to essentially a closed-loop path between the magnet core and the guideway rail. A second advantage is the ability of the transport vehicle to remain in a levitated state at slows speeds or at idle without a need for auxiliary retractable wheels. Additional advantages include low power consumption and resistance to derailing.

Many of the disadvantages associated with EMS-type MAGLEV systems which use non-superconducting electromagnets are centered around the comparatively low magnetic field that they generate. One significant disadvantage is that the clearance gap between the magnet core poles and the guideway rail is quite small, approximately 1 cm (0.4 inches) for example. The existence of a small clearance gap degrades system performance and jeopardizes operational safety by increasing the likelihood that the transport vehicle will become involved in an accident because of ice build up or other debris on the guideway. In addition, a system which operates with a small clearance gap is costly to construct and maintain. Other significant disadvantages include high vehicle weight and limited payload or freight capability.

EDS-type MAGLEV systems levitate and propel a transport vehicle by inducing magnetic forces of repulsion between vehicle-mounted electromagnets and ferromagnetic rails on a guideway. The Japanese MLU is such a system. The electromagnets used in the Japanese MLU are air-core superconducting electromagnets, which rely primarily on eddy currents to provide the levitation and propulsion forces required. Other EDS-type MAGLEV systems using air-core superconducting electromagnets are known, including, for example, one disclosed in U.S. Pat. No. 5,094,173.

The Japanese MLU overcomes some of the disadvantages associated with the German Transrapid. For example, the superconducting electromagnets used in the Japanese MLU produce a magnetic field which is much stronger than that produced by the copper coil electromagnets used in the German Transrapid. The Japanese MLU is therefore able to establish a significantly larger clearance gap (4–6 inches), permitting it to operate more safely, at a reduced cost, and with less maintenance than the German Transrapid.

The Japanese MLU, however, possesses at least three significant drawbacks which are not realized by the German Transrapid. First, the air-core of the Japanese MLU superconducting electromagnet is responsible for generating high levels of magnetic field in the transport vehicle. Shielding must be installed in order to compensate for this undesirable effect. Second, the Japanese MLU is susceptible to experiencing magnetic quench (i.e., changing from a superconducting state to a normal state) caused by dynamic effects. Third, the Japanese MLU must travel on wheels up to a speed of 60 miles/hour before it starts to levitate. In contrast, EMS vehicles remain levitated at all speeds, including stand still.

At least one MAGLEV system has been proposed which attempts to achieve the advantages of both the German Transrapid and Japanese MLU without achieving their disadvantages. This EMS-type MAGLEV system is disclosed in U.S. patent application Ser. No. 875,641, and represents a significant improvement over the German and Japanese systems, with its combination of an attractive-type suspension and an electromagnet having a superconducting coil and a multiple-pole iron core.

The advantages of the multiple-pole superconducting electromagnet include its ability to achieve a clearance gap with a relatively low number of ampere-turns, a reduction in the migration of stray magnetic fields into the transport vehicle, its ability to transmit most of the vehicle loading to the magnet core rather than to the coil windings, and a reduction in the possibility of magnetic quench caused by winding slip. However, this type of electromagnet requires a low-temperature superconducting coil which is costly to build, operate, and maintain. Also, electromagnets employing low-temperature superconducting coils have proven to be less reliable and demand stringent cryogenic cooling requirements, which necessarily requires the employ of a complex cryostat to maintain the coil in the superconducting state.

SUMMARY OF THE INVENTION is a principal objective of the present invention to provide a superconducting electromagnet arrangement for levitating and propelling a MAGLEV transport vehicle along a guideway which incorporates the advantages of both the German Transrapid and the Japanese MLU without incorporating their disadvantages.

It is another objective of the present invention to provide a superconducting electromagnet arrangement for levitating and propelling a MAGLEV transport vehicle along a guideway which achieves the principal objective by employing high-critical-temperature superconducting technology.

It is a further objective of the present invention to provide a superconducting electromagnet arrangement for levitating and propelling a MAGLEV transport vehicle along a guideway which has low manufacturing, operating, and maintenance costs compared with existing superconducting MAGLEV systems.

It is another objective of the present invention to provide a superconducting electromagnet arrangement for levitating and propelling a MAGLEV transport vehicle along a guideway which reduces the migration of stray magnetic flux into the vehicle passenger compartment.

It is another objective of the present invention to provide a superconducting electromagnet arrangement for levitating and propelling a MAGLEV transport vehicle along a guideway which operates reliably in a variety of weather conditions.

It is another objective of the present invention to provide a superconducting electromagnet arrangement for levitating and propelling a MAGLEV transport vehicle along a guideway which is capable of performing safely at all operating speeds.

It is another objective of the present invention to provide a superconducting electromagnet arrangement for levitating and propelling a MAGLEV transport vehicle along a guideway which includes a set of control coils for vehicle stabilization.

It is another objective of the present invention to provide a superconducting electromagnet arrangement for levitating and propelling a MAGLEV transport vehicle along a guideway which has a versatile configuration capable of adapting to any type of MAGLEV system, including EMS- or EDS-type MAGLEV systems.

These and other objectives of the invention are achieved by providing a superconducting electromagnet arrangement for levitating and propelling a MAGLEV transport vehicle along a vehicle guideway which includes a high-temperature superconducting (HTS) coil surrounding a multiple-pole, laminated iron core. The superconducting electromagnet is preferably used in an EMS-type MAGLEV system, but may be adapted to operate with other types of MAGLEV systems.

The HTS coil is enclosed within a sealed, double-walled cryostat and operates in the DC mode at approximately liquid nitrogen temperature of 77 K. In operation, the HTS coil induces a magnetic field in the iron core, which in turn causes the poles of the core to become magnetically attracted to a guideway rail levitating the transport vehicle. The core poles and the rail are separated by an air gap whose length is proportional to the strength of the magnetic field created by the HTS coil. Lines of magnetic flux between the core poles and guideway rails traverse essentially a closed-loop path across the air gap region. This closed-loop path reduces substantially the migration of stray magnetic flux into the passenger compartment of the transport vehicle.

A preferred embodiment of the superconducting electromagnet arrangement of the present invention includes an HTS coil surrounding a C-shaped iron core. The C-shaped core contains a base and two legs. The poles of the core are located at the distal end of each leg and the HTS coil is situated around the base. Most of the vehicle loading is sustained by the iron core rather than the windings of the coil, a result of which is to increase the internal structural stability of the transport vehicle.

The HTS coil is constructed from a single layer of a predetermined number of pancake coils. The winding of each pancake coil is fabricated from short lengths of commercially available conductor tape having a critical current density of 22 A/mm$^2$ at 0.3 T magnetic field strength and an operating current density of 13.3 A/mm$^2$. The resulting field strength in the iron core and coil windings are respectively approximately 1.8 T and approximately 0.3 T. The core poles are levitated off of the guideway rail by an air gap length of 4 to 5 cm. The considerable size of this air gap minimizes guideway installation and maintenance expenses and decreases the likelihood of the vehicle becoming involved in an accident. A variation of the HTS coil design includes two concentric layers of pancake coils.

To ensure vehicle stability, control coils are placed around the core legs to provide the additional magnetic force required to correct deviations in the air gap length, caused by, for example, changes in vehicle loading or pitch angle. The control coils may be copper coils, or may themselves be HTS coils operating in the AC mode at 77 K (nominal).

A variation of the preferred embodiment includes three HTS coils surrounding respectively the three legs of a W-shaped iron core.

DETAILED DESCRIPTION OF THE PREFERRED EMBODIMENTS

A MAGLEV transportation system employing the superconducting electromagnet arrangement of the present invention typically includes: an aerodynamically designed transport vehicle containing a passenger compartment; a guideway containing one or more rails for guiding the transport vehicle along a predetermined route; and a suspension member mounted on the lower portion of the transport vehicle for carrying one or more superconducting electromagnets in a preconceived configuration above the rails of the guideway. Although the superconducting electromagnet arrangement of the present invention preferably is employed in an EMS-type MAGLEV system, it may be adapted to operate in an EDS-type or any other MAGLEV system contemplated.

The transport vehicle design, including its size, shape, and transport capacity, is left wholly within the discretion of the system designer in the context of the present invention. The transport vehicle is not to be limited to any particular type of vehicle, whether passenger or freight, or to a particular application such as high speed mass transportation system for transporting persons over long, or short, distances. The manner in which the transport vehicle is adapted for magnetic levitation travel is also a consideration left to the system designer. The system may rely solely on the superconducting electromagnet of the present invention as its primary means of levitation and propulsion, or may be supplemented with a set of auxiliary wheels.

Figure 2:
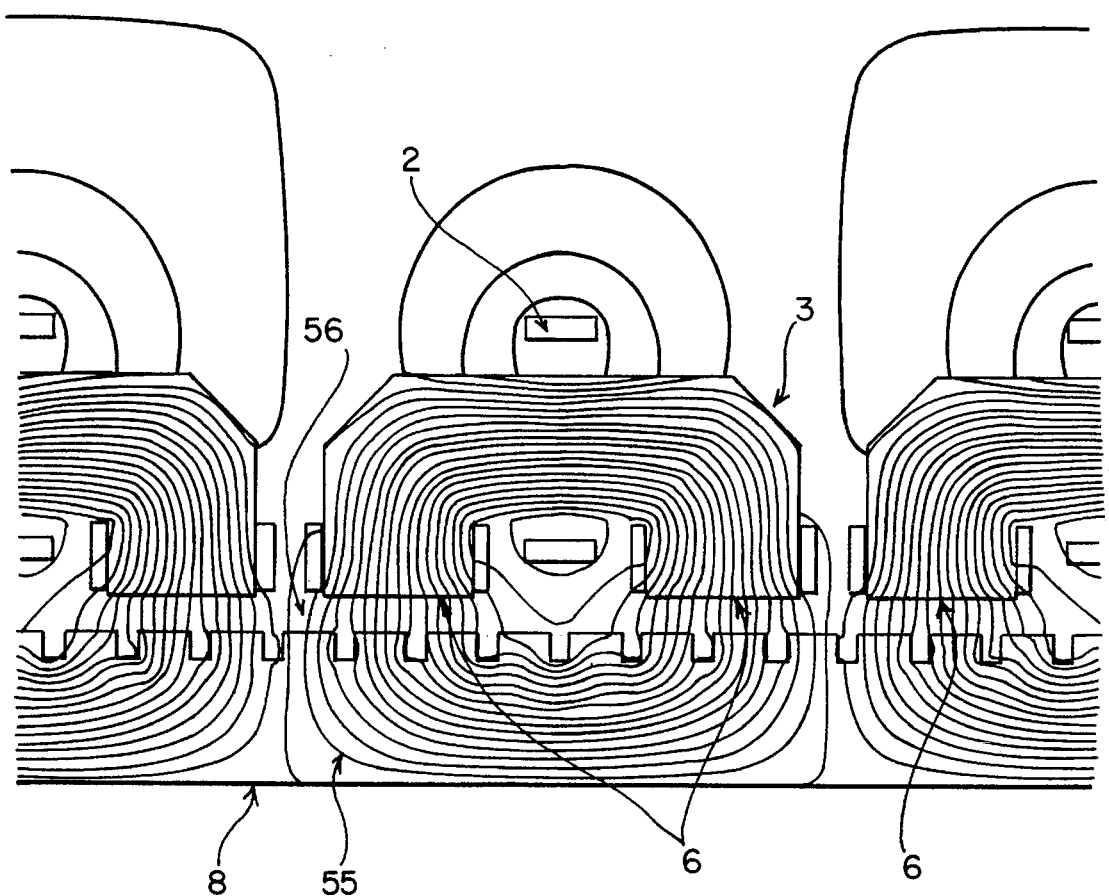
FIG. 2 is a diagram showing the magnetic flux distribution between a rail in a vehicle guideway and the poles of an iron core included in the superconducting electromagnet arrangement of the present invention.

The vehicle guideway may contain one or two ferromagnetic reaction rails. Each rail, for example, may be of the type which includes a pattern of alternating groove-and-tooth pairs, as depicted in FIG. 2. Included within each groove is a ground coil (not shown) which interacts with the vehicle-mounted superconducting electromagnets to provide propulsion in a manner which will be described in greater detail below.

The suspension member may be adapted for use with a single- or dual-rail guideway. For a single-rail guideway, the suspension member may be of the T-bar type which carries superconducting electromagnets along a central longitudinal axis of the transport vehicle above the single rail. For a dual-rail guideway, the suspension member may be of the type disclosed in U.S. patent application Ser. No. 07/875,641, which carries a row of superconducting electromagnets on either side of the transport vehicle above the guideway rails.

The electromagnet arrangement of the present invention contains an HTS coil surrounding a multiple-pole, laminated iron core which performs two principal functions. First, it provides magnetic forces of attraction necessary to levitate the transport vehicle off of the surface of the guideway rails, the manner of which will now be described. DC excitation current supplied to the HTS coil from a constant current power source causes the coil to induce a magnetic field in the iron core. The poles of the core, as a consequence, become magnetically attracted to a guideway rail, and this magnetic force of attraction behaves as an opposing, counterbalancing force to the vehicle loading, a result of which is to cause the cores, and thus the transport vehicle, to become levitated off of the surface of the rail. The core poles and rail are separated by an air gap whose length is proportional to strength of the magnetic field induced by the HTS coil. Most of the vehicle loads are borne solely by the core and suspension member. Only a small portion of the vehicle loads are transmitted to the windings of the HTS coil.

The electromagnetic arrangement of the present invention serves as field magnet to enable a linear motion device, such as a linear synchronous motor, to provide the forces required to propel the transport vehicle. This is accomplished in the following manner. The magnetic field of attraction between the core poles and rail causes the current in the ground coil of the rail to change as the vehicle travels along the guideway. The changing current in the ground coils, in turn, creates a traveling magnetic wave. The poles of each core "surf" on this magnetic wave, imparting linear motion to the transport vehicle.

The HTS coil is enclosed within a hermetically-sealed, annular-shaped cryostat which provides the cryogenic cooling required to maintain the coil in a superconducting state. The cryostat preferably is a double walled vessel whose interior space is partitioned into two annular portions, a first annular portion representing a coil vessel and a second annular portion representing a room-temperature vacuum vessel. The coil vessel and the room-temperature vessel are hermetically sealed independently of one another. The HTS coil is sealed within the coil vessel, and the coil vessel is sealed within the room-temperature vacuum vessel.

The HTS coil operates in the DC mode at approximately liquid nitrogen ($LN_2$) temperature (77 K). A sufficient quantity of liquid nitrogen is carried within the cryostat to enable the coil to operate in a superconducting state for an extended period of time, i.e., at least 48 hours. Any and all liquid nitrogen that does boil off in the cryostat is released into the atmosphere. This advantageously eliminates the need for the on-board refrigerator that low-temperature superconducting MAGLEV systems require, and thus simplifies the operation of the cooling system and makes a significant reduction in the overall weight of the electromagnet.

Figure 1:
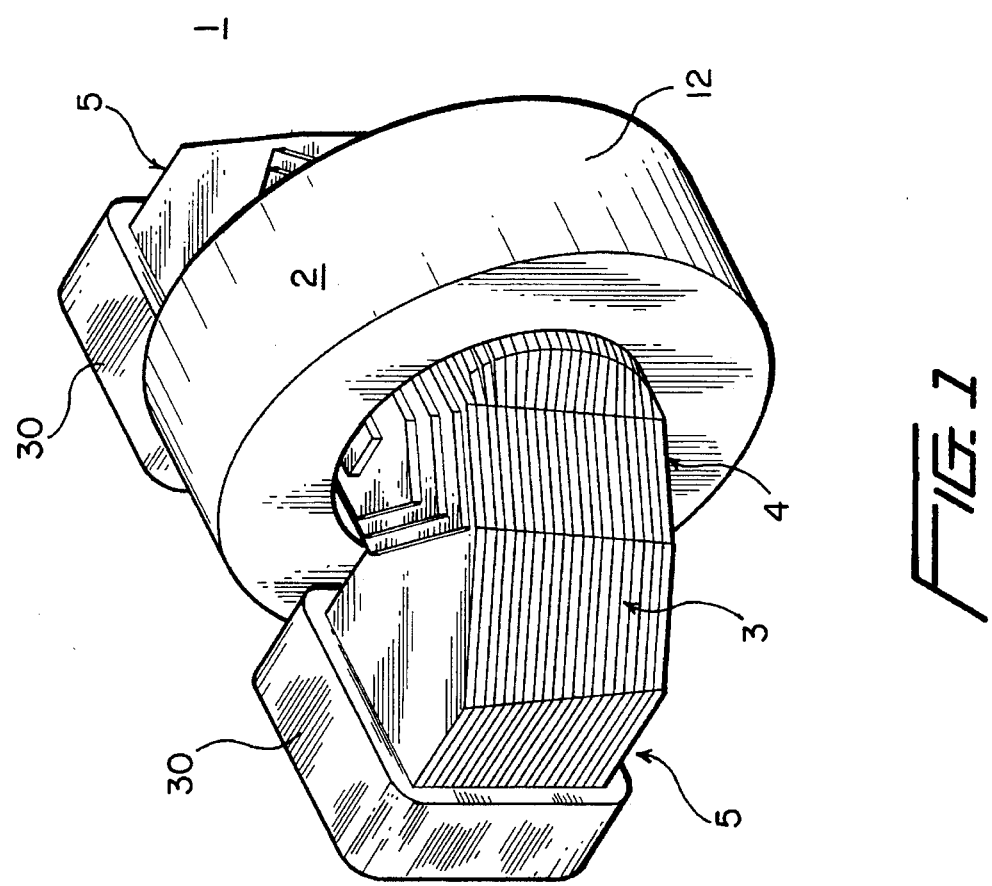
FIG. 1 is a diagram showing a preferred embodiment of the superconducting electromagnet arrangement in accordance with the present invention.

Referring to FIGS. 1 and 2, a preferred embodiment of the superconducting electromagnet 1 of the present invention includes an HTS coil 2 surrounding a C-shaped, laminated iron core 3. Core 3 includes a base portion 4 and two symmetrical leg portions 5. The distal ends of leg portions 5 include magnetic pole surfaces 6 which are suspended from a transport vehicle a predetermined distance above and in opposing relation to a rail 8 of a vehicle guideway.

HTS coil 2 is fabricated from a superconducting material, for example, Bi 2223 wire stabilized with a silver jacket. Because the current density of the HTS material is very sensitive to the field strength and the orientation of the superconductor wire with respect to the field, HTS coil 2 preferably is fabricated from a conductor tape which advantageously may be oriented so that the field direction is parallel to the plane of the conductor tape in the coil. Round, square, or rectangular conductors, however, may be used in lieu of conductor tape.

Figure 3:
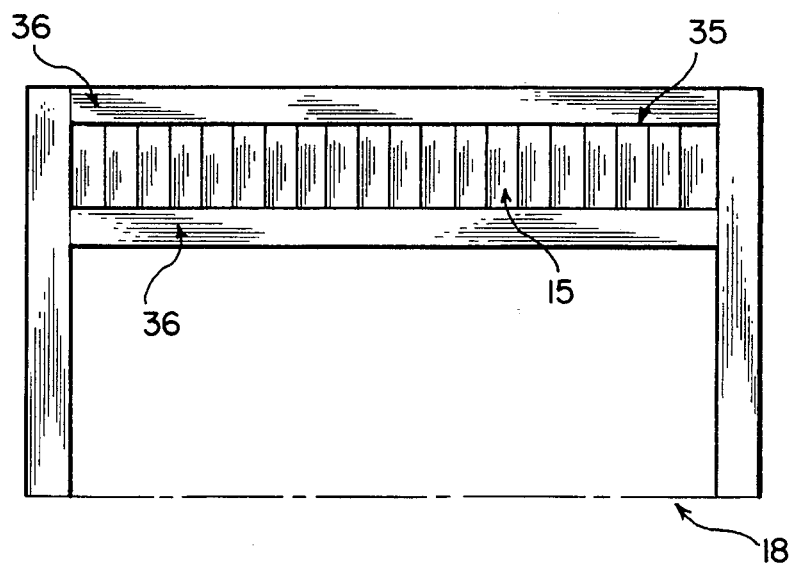
FIG. 3 is a diagram showing a cross-section of an HTS coil constructed from a single layer of pancake coils in accordance with the superconducting electromagnet arrangement of the present invention.

Most preferably, as shown in FIG. 3, HTS coil 2 is fabricated from a single layer 35 of epoxy-impregnated pancake coils 15 assembled along a common axis 18 and secured between two support members 36. The windings of each pancake coil may be fabricated from short lengths of commercially available conductor tape. The conductor tape of FIG. 3 is 50 m long, 6 mm wide, and 0.1 mm thick. Insulation added to the conductor tape increases these dimensions to approximately 6.5 mm and 0.2 mm in width and thickness, respectively. This 6.5 mm width also includes any inter-pancake coil insulation that might be required. In addition, the current conductor tapes are silver stabilized.

Figure 4:
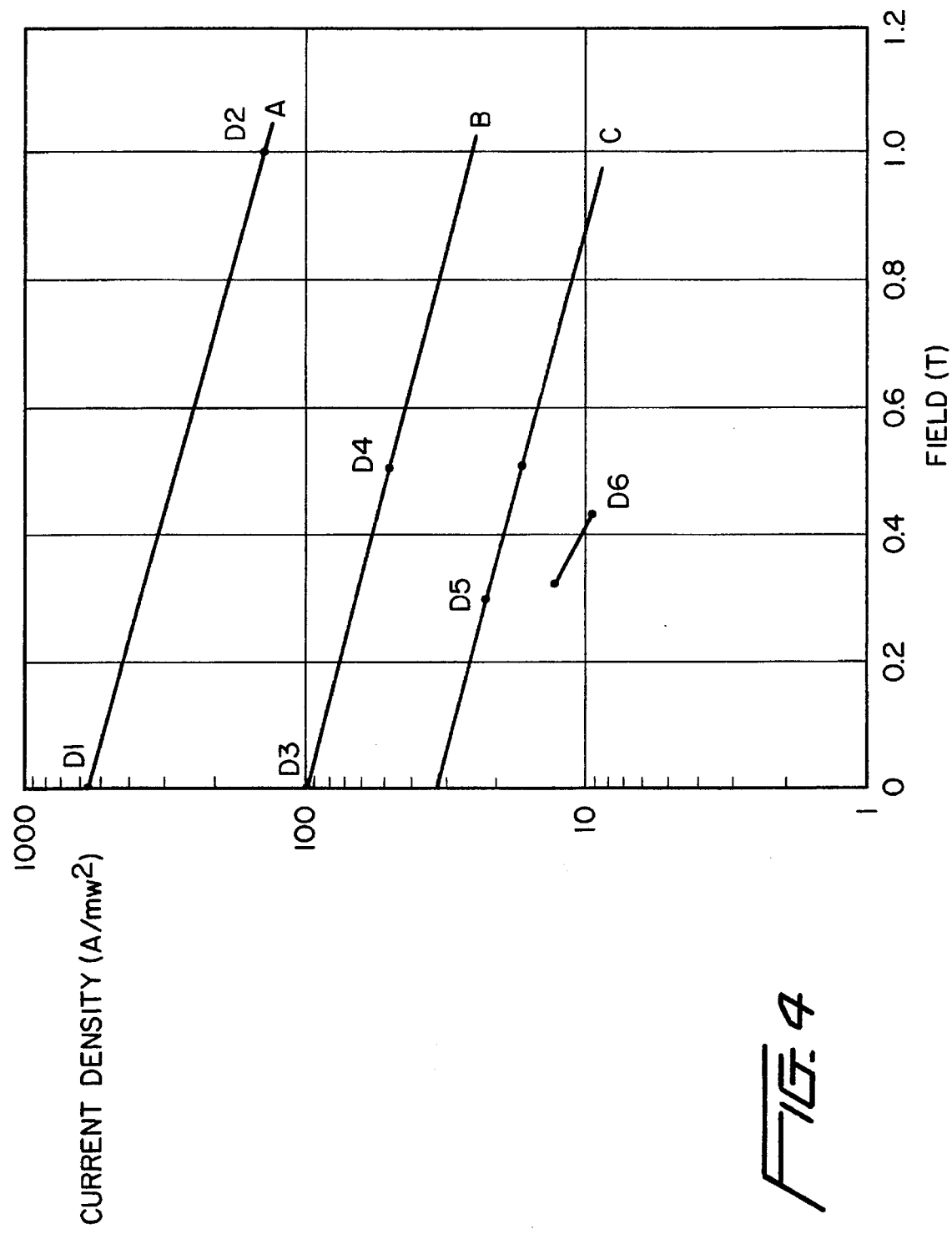
FIG. 4 is a graph showing the characteristics of a conductor tape which can be used to construct the HTS coil in accordance with the superconducting electromagnet arrangement of the present invention.

FIG. 4 is a graph showing experimental results for a variety of HTS tapes representative of the current state of the art. The graph plots critical current density ($J_c$) in units of $A/mm^2$ versus magnetic field strength in units of Tesla (T). All critical current density values on the graph represent the best laboratory samples for the superconducting core. Curve A thereon shows that short lengths of conductor tape have demonstrated $J_c$ values of 540 $A/mm^2$ at 0 T and 120 $A/mm^2$ at 1 T field. These values are represented on the graph as D1 and D2, respectively. These experimental results have been published in the articles MAG-27, IEEE Transactions on Magnetics, page 1231 (1991) and *Development of Silver-Sheathed Bismuth Superconducting Wires and Their Applications*, Journal of Applied Physics, Vol. 70, page 6484, Nov. 15, 1991. Other points on Curve A approximate the performance of these tapes at intermediate field levels.

Curve B on the graph shows that long lengths of conductor tape (e.g., 100 m or more) have demonstrated a $J_c$ value of 97 $A/mm^2$ at 0 T, represented as data point D3 on the graph. This experimental result was reported at the MRS spring meeting held in San Francisco, Calif. on April 27 to May 1, 1992. Other points on Curve B approximate the performance of this tape at intermediate field levels.

Curve B on the graph also shows that a 50 m long sample of conductor tape by a U.S. manufacturer demonstrated a $J_c$ value of 48 $A/mm^2$ at 0.5 T. This value is represented as D4 on the graph.

Curve C represents an overall current density of an HTS conductor including the space occupied by the silver stabilizer (silver to superconductor ratio of 2).

The parameters for one possible configuration of HTS coil 2 constructed from a single layer of pancake coils are summarized in Table 1 below. (Discussion of this coil configuration is based on the currently available state-of-the-art of HTS conductors. The coil configuration might change as technology of HTS conductors develops further. However, the concept of applying an HTS coil to iron core magnet remains unique.)

TABLE 1

| Parameter | Units | Value |
| --- | --- | --- |
| Hi-Tc SC tape size: | | |
| width | mm | 6 |
| thickness | mm | 0.1 |
| Insulation | mm | 0.08 |
| Jc at 77K (@ 0.3 T) | A/mm² | 22 |
| Critical current of wire | A | 13 |
| Operating current of wire | A | 8 |
| Amperes/turn | A | 40 |
| Ampere-turns/pancake | A-T | 3,000 |
| Number of turns/pancake | | 375 |
| Number of pancakes | | 20 |
| Width of each pancake | mm | 6.5 |
| Overall coil dimensions: | | |
| width | mm | 130 |
| thickness | mm | 70 |
| Mean-turn radius | m | 0.32 |
| Conductor length/pancake | m | 75 |
| Conductor co-wound | | 5 |

As shown in the table, the operating point for the conductor tape selected corresponds to a $J_c$ value of 22 A/mm² at 0.3 T magnetic field strength. This data point is represented as D5 on curve C on the graph of FIG. 4. The operating current density of this conductor tape is 13.3 A/mm², shown as D6 on curve C. The critical current of this conductor is 13 A, but its operating current is 8 A to provide some safety margin. A total of 7500 turns of the conductor tape is required to furnish the magnetic forces necessary to impart levitation and propulsion to a transport vehicle. This number of turns is achieved by using 20 pancake coils each having 375 turns (each coil is comprised of 5 tapes in parallel each having 75 turns). The axial length for this 20-pancake coil is 130 mm.

In practice, the tape conductors preferably are reacted before they are wound into the pancake coils used to construct HTS coil 2. This is possible because the winding radius for each pancake coil is much larger than the thickness of the conductor tape. As a result, very little strain is produced in the conductor tape, i.e., less than 0.1%. A stainless steel tape is co-wound with every five-conductor bundle to provide hoop strength to the $HiT_c$ coil.

Figure 5:
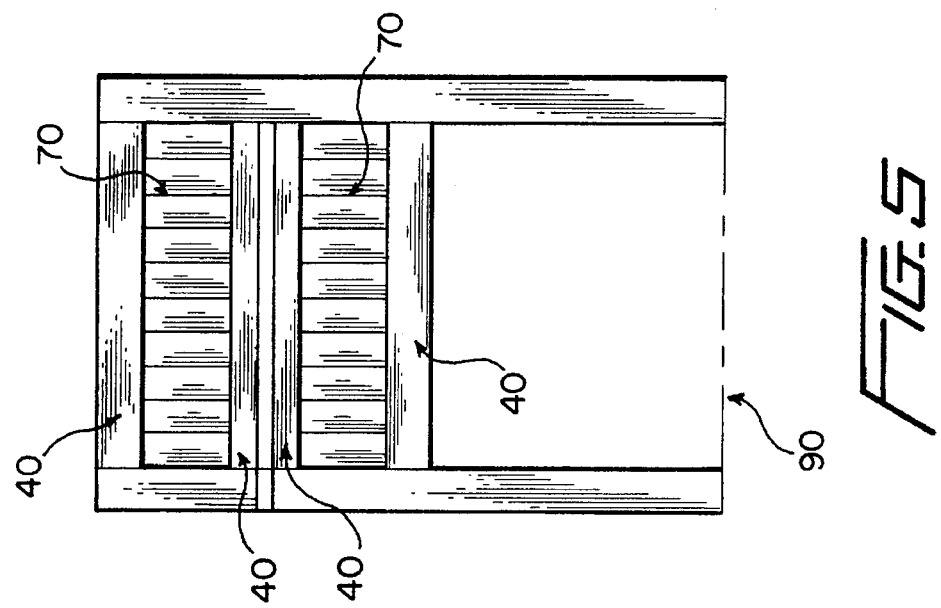
FIG. 5 is a diagram showing a cross-section of an HTS coil constructed from a double layer of pancake coils in accordance with the superconducting electromagnet arrangement of the present invention.

As an alternative to the above configuration, HTS coil 2 may be fabricated from multiple, concentric layers of pancake coils assembled together along a common axis. FIG. 5 illustrates an HTS coil fabricated from two concentric layers of pancake coils 70 about a common axis 90. Each layer of pancake coils is secured between aluminum support members 40.

FIG. 2 shows the magnetic flux distribution induced in core 3 by HTS coil 2. As depicted, the lines of magnetic flux 55 traverse essentially a closed-loop path across air gap region 56 between core poles 6 and guideway rail 8. This closed-loop path ensures that most of the magnetic flux resides within the core and the rail, thus reducing substantially the migration of stray magnetic flux into the passenger compartment of the transport vehicle. For the parameters listed above, the peak field in the iron core is approximately 1.8 T, while the peak field in the superconducting winding region is approximately 0.3 T.

HTS coil 2 supplies 60,000 ampere-turns to generate the field in the air gap region required to levitate the transport vehicle. The strength of the magnetic field in this region is sufficient to levitate the poles of the core, and thus the transport vehicle, off of the surface of the rail by 1.6 to 2 inches (or 4 to 5 cm) inclusive. This size air gap advantageously minimizes guideway installation and maintenance expenses, and also decreases the likelihood of the transport vehicle becoming involved in an accident resulting from ice build up or other debris forming on the surface of the guideway rails.

In practice, the air gap length is subject to change because of changes in vehicle loading or wind loading, or because of changes in vehicle pitch angle resulting from the vehicle negotiating a turn or going uphill or downhill. In order to ensure vehicle stability, it is imperative that the 4 to 5 cm air gap length be preserved. There is one problem, however. In order to maintain coil 2 in a high-critical-temperature superconducting state, the current supplied to it cannot be changed faster than a 1 Hz rate. This inherent limitation of the HTS coil renders it unable to respond to fast changes in air gap length.

To compensate for the slow reaction time of coil 2, control coils 30 are mounted on the legs of core 3, as depicted in FIG. 1, to provide the vehicle stability required. Control coils 30 preferably are operated up to 20 Hz to enable them to respond to fast changes in air gap length, however any frequency between 0 Hz and 20 Hz may be used. Coils 30 can achieve this result regardless of whether the transport vehicle is in motion or resting in a levitated state.

Control coils 30 may be copper coils operating in the AC mode, or conceivably may be HTS coils operating in the AC mode at 77 K (nominal). In this latter configuration, HTS coil 2 surrounding the base of core 3 may no longer be required because the HTS control coils will themselves be able to provide the forces required to levitate and propel the transport vehicle, and because a superconducting coil surrounding the core base is generally less efficient at producing a desired field in the air gap region. HTS control coils are preferable because they may be more tolerant of eddy-current heating.

The general theory of operation of the control coils will now be explained. Excitation current is supplied to control coils 30 when the actual air gap length deviates from the desired 4 to 5 cm air gap length. Control coils 30 respond by increasing the magnetic force of attraction between the core poles and the guideway rail. The magnitude of the excitation current supplied to the control coil is commensurate with an amount required to correct the air gap length between the core poles and the guide rail back to the desired gap length.

The superconducting electromagnet arrangement of the present invention is not limited to the C-shape design depicted in FIG. 1. Variations may include any core shape with any number of poles or legs. For example, one variation contemplates three HTS superconducting coils surrounding respectively the three legs of a W-shaped, laminated iron core. Such an electromagnet operates in a manner analogous to the manner in which the two-pole configuration shown in FIG. 1 operates. In another variation, only a single HTS coil may be used on the central leg of a 3-leg core.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

We claim:

1. An electromagnet arrangement for providing magnetic forces for levitating and propelling a magnetic levitation vehicle along a magnetically permeable guide rail, the electromagnet arrangement comprising:

a magnetically permeable core having a plurality of magnetic poles facing the rail, the poles being separated from the rail by an air gap of a predetermined length;

at least one high-critical-temperature superconducting coil surrounding the core for inducing a magnetic field in the core to cause the poles of the core to become attracted to the rail when current is supplied to the coil; and a plurality of control coils surrounding respectively the magnetic poles of the core, said control coils receiving excitation current in response to a change in the air gap length between the poles and the rail for effecting an increase in the magnetic forces of attraction between the core poles and the rail, said excitation current being supplied in an amount commensurate with an amount required to correct the air gap length between the poles and the rail back to said predetermined length, wherein the control coils are HTS coils operated in AC mode.

2. An electromagnet arrangement as recited in claim 1, wherein said control coils operate at a frequency which less than 20 Hz.

3. An electromagnet arrangement as recited in claim 1, wherein the control coils are copper coils.

4. An electromagnet arrangement for providing magnetic forces for levitating and propelling a magnetic levitation vehicle along a magnetically permeable guide rail, the electromagnet arrangement comprising:

a magnetically permeable core having a plurality of magnetic poles facing the rail, the poles being separated from the rail by an air gap of a predetermined length;

at least one high-critical-temperature superconducting main coil surrounding the core for inducing a magnetic field in the core to cause the poles of the core to become attracted to the rail when current is supplied to the main coil; and a plurality of control coils surrounding respectively the magnetic poles of the core, said control coils receiving excitation current in response to a change in the air gap length between the poles and the rail for effecting an increase in the magnetic forces of attraction between the core poles and the rail, said excitation current being supplied in an amount commensurate with an amount required to correct the air gap length between the poles and the rail back to said predetermined length, wherein the control coils are HTS coils operated in DC mode.

5. An electromagnet arrangement as recited in claim 1, wherein said main coil operates in DC mode.

6. An electromagnet arrangement as recited in claim 1, wherein said main coil operates in AC mode.

7. An electromagnet arrangement as recited in claim 1, wherein said main coil operates at a temperature of approximately 77 K.

8. An electromagnet arrangement as recited in claim 1, wherein said main coil is constructed from Bi 2223 superconducting tape.

9. An electromagnet arrangement as recited in claim 1, wherein the core is fabricated from laminated iron.

10. An electromagnet arrangement as recited in claim 1, wherein said predetermined gap length is between 4 and 5 cm inclusive.

11. An electromagnet arrangement as recited in claim 1, wherein the core has a substantially C-shape including a base and two legs, distal ends of the legs including said magnetic poles and the superconducting coil surrounding said base.

12. An electromagnet arrangement for providing magnetic forces for levitating and propelling a magnetic levitation vehicle along a magnetically permeable guide rail, the electromagnet arrangement comprising:

a magnetically permeable core having a plurality of magnetic poles facing the rail, the poles being separated from the rail by an air gap of a predetermined length;

at least one high-critical-temperature superconducting main coil surrounding the core for inducing a magnetic field in the core to cause the poles of the core to become attracted to the rail when current is supplied to the main coil; and a plurality of control coils surrounding respectively the magnetic poles of the core, said control coils receiving excitation current in response to a change in the air gap length between the poles and the rail for effecting an increase in the magnetic forces of attraction between the core poles and the rail, said excitation current being supplied in an amount commensurate with an amount required to correct the air gap length between the poles and the rail back to said predetermined length, wherein said core has a substantially W-shape including a base and three legs, three HTS coils surrounding respectively the three legs of said core, distal ends of said legs including said magnetic poles.

13. An electromagnet arrangement as recited in claim 1, wherein the peak magnetic field in the core is approximately 1.8 T and the peak magnetic field in a region surrounding the main coil is approximately 0.3 T.

14. An electromagnet arrangement as recited in claim 1, wherein said main coil supplies 60,000 ampere-turns to generate said magnetic field.

15. An electromagnet arrangement as recited in claim 1, wherein said main coil is fabricated from a conductor selected from the group consisting of round conductors, square conductors, and rectangular conductors.

16. An electromagnet arrangement as recited in claim 1, wherein said main coil is constructed from a single layer of a predetermined number of pancake coils assembled together along a common axis, each of said pancake coils being constructed from a conductor tape of a predetermined length, width, and thickness.

17. An electromagnet arrangement as recited in claim 16, wherein said layer of pancake coils is secured between two support members.

18. An electromagnet arrangement as recited in claim 1, wherein said main coil is constructed from two concentric layers of pancake coils assembled together along a common axis, each of said pancake coils being fabricated from a conductor tape of a predetermined length, width, and thickness.

19. An electromagnet arrangement as recited in claim 18, wherein each of said two layers of pancake coils is secured between two support members.

20. An electromagnet arrangement as recited in claim 1, wherein said main coil is enclosed within a double-walled, annular cryostat.

21. An electromagnet arrangement as recited in claim 1, wherein the control coils are aluminum coils.

22. An electromagnet arrangement as recited in claim 4, wherein said main coil operates in DC mode.

23. An electromagnet arrangement as recited in claim 4, wherein said main coil operates in AC mode.

24. An electromagnet arrangement as recited in claim 4, wherein said main coil operates at a temperature of approximately 77 K.

25. An electromagnet arrangement as recited in claim 4, wherein said main coil is constructed from Bi 2223 superconducting tape.

26. An electromagnet arrangement as recited in claim 4, wherein the core is fabricated from laminated iron.

27. An electromagnet arrangement as recited in claim 4, wherein said predetermined gap length is between 4 and 5 cm inclusive.

28. An electromagnet arrangement as recited in claim 4, wherein the core has a substantially C-shape including a base and two legs, distal ends of the legs including said magnetic poles and the superconducting coil surrounding said base.

29. An electromagnet arrangement as recited in claim 4, wherein the peak magnetic field in the core is approximately 1.8 T and the peak magnetic field in a region surrounding the main coil is approximately 0.3 T.

30. An electromagnet arrangement as recited in claim 4, wherein said main coil supplies 60,000 ampere-turns to generate said magnetic field.

31. An electromagnet arrangement as recited in claim 4, wherein said main coil is fabricated from a conductor selected from the group consisting of round conductors, square conductors, and rectangular conductors.

32. An electromagnet arrangement as recited in claim 4, wherein said main coil is constructed from a single layer of a predetermined number of pancake coils assembled together along a common axis, each of said pancake coils being constructed from a conductor tape of a predetermined length, width, and thickness.

33. An electromagnet arrangement as recited in claim 32, wherein said layer of pancake coils is secured between two support members.

34. An electromagnet arrangement as recited in claim 4, wherein said main coil is constructed from two concentric layers of pancake coils assembled together along a common axis, each of said pancake coils being fabricated from a conductor tape of a predetermined length, width, and thickness.

35. An electromagnet arrangement as recited in claim 34, wherein each of said two layers of pancake coils is secured between two support members.

36. An electromagnet arrangement as recited in claim 4, wherein said main coil is enclosed within a double-walled, annular cryostat.

* * * * *